(12) United States Patent
Zhang et al.

(10) Patent No.: US 9,239,869 B1
(45) Date of Patent: Jan. 19, 2016

(54) REPLICATION AND SYNCHRONIZATION FOR PROTECTING NTFS DEDUPLICATION VOLUMES

(71) Applicant: CA, Inc., Islandia, NY (US)

(72) Inventors: Haiyang Zhang, Beijing (CN); Gong jun Fei, Beijing (CN); Guoxian Shang, Beijing (CN); Shaorong Li, Beijing (CN)

(73) Assignee: CA, Inc., Islandia, NY (US)

( * ) Notice: Subject to any disclaimer, the term of this patent is extended or adjusted under 35 U.S.C. 154(b) by 304 days.

(21) Appl. No.: 13/890,007

(22) Filed: May 8, 2013

(51) Int. Cl.
*G06F 17/30* (2006.01)

(52) U.S. Cl.
CPC .................. *G06F 17/30575* (2013.01)

(58) Field of Classification Search
None
See application file for complete search history.

(56) References Cited

U.S. PATENT DOCUMENTS

| | | | |
|---|---|---|---|
| 7,584,338 B1 * | 9/2009 | Bricker et al. | 711/162 |
| 7,613,750 B2 * | 11/2009 | Valiyaparambil et al. | |
| 8,127,109 B2 * | 2/2012 | Matze | 711/216 |
| 8,370,297 B2 * | 2/2013 | Anglin et al. | 707/616 |
| 8,843,443 B1 * | 9/2014 | Xing et al. | 707/639 |
| 2007/0276885 A1 * | 11/2007 | Valiyaparambil et al. | 707/204 |
| 2010/0235332 A1 * | 9/2010 | Haustein | G06F 17/30315 707/692 |
| 2010/0325180 A1 * | 12/2010 | Lee | 707/823 |
| 2014/0188805 A1 * | 7/2014 | Vijayan | 707/646 |

* cited by examiner

*Primary Examiner* — Debbie Le
(74) *Attorney, Agent, or Firm* — Gilliam IP PLLC

(57) ABSTRACT

Various embodiments illustrated and described herein include systems, methods, and computer program products to protect NTFS deduplicated volumes. Some embodiments select a data protection mode from various modes to protect deduplicated volumes. Some data protection modes retrieve the deduplicated files and associated data chunks without rehydrating the files and send them to a replica. Some data protection modes rehydrate deduplicated files as they are retrieved, send the rehydrated files to the replica, and turn on deduplication at the replica so the files can be deduplicated on the replica. Deduplication settings can also be transferred to the replica so that deduplication on the replica mimics deduplication on the source. Some data protection modes replicate the deduplicated files to the replica.

20 Claims, 7 Drawing Sheets

US 9,239,869 B1

REPLICATION AND SYNCHRONIZATION FOR PROTECTING NTFS DEDUPLICATION VOLUMES

BACKGROUND

The disclosure relates generally to protecting information through backup of information, and more particularly, to synchronization and replication of NTFS deduplication volumes.

BRIEF SUMMARY

According to one aspect of the present disclosure a system may identify a mode of data protection such as volume level synchronization, file level synchronization or replication.

In volume level synchronization, deduplicated files and a chuck store are retrieved without rehydrating the files and both the deduplicated files and the chunk store are sent to the replica for storage.

In file level synchronization, deduplicated files are retrieved in a manner that rehydrates the files and the rehydrated files are sent to the replica for storage. Deduplication settings can also be retrieved and sent to the replica and deduplication enabled on the replica using these settings. By matching the deduplication settings on the replica to the settings of the master, the files may be deduplicated on the replica in the same manner as they are on the master.

In replication, data is captured on the master (such as by using a filtering driver) and sent to a replica. The replica can apply the data to in the same manner as on the master to keep the master and replica in sync. Deduplication may be enabled on the replica using the settings on the master so that files on the replica are deduplicated in the same fashion as they are on the master.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
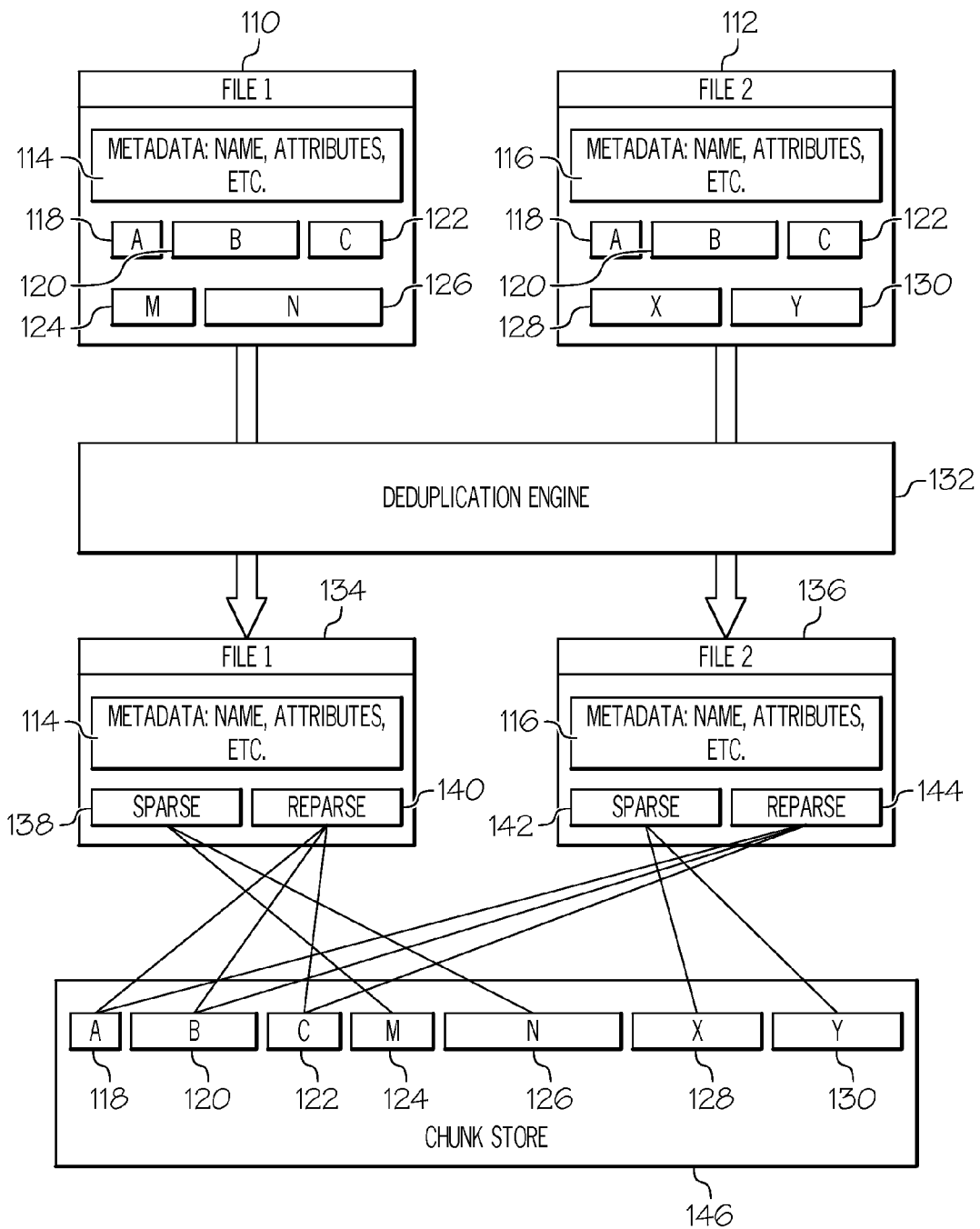
FIG. 1 illustrates an example of deduplicated files and chunk store.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example of deduplicated files and chunk store. The illustrated example is a conceptual diagram of a version of the Windows Operating System file deduplication in NTFS volumes. As files are stored on a volume, there is often common information across several files. Deduplication changes the structure of the files to store the common information once so the overall storage requirements are reduced.

FIG. 1 illustrates two files, file 1 and file 2, illustrated as 110 and 112, respectively. Each file has metadata (114 and 116, respectively) and data stored in one or more streams. The data in the streams can be "chunked" or broken into parts. File 1 has data chunks 118, 120, 122, 124 and 126 while file 2 has data chunks 118, 120, 122, 128 and 130. Thus, chunks 118, 120 and 122 are common between file 1 and file 2, while chunks 124, 126, 128 and 130 are not.

Some versions of the Windows Operating System, such as Windows Server 2012, have a deduplication feature. Deduplication as implemented by the Windows Operating System has several characteristics. Deduplication is not in the write-path when new files come along. New files write directly to the NTFS volume and the files are evaluated for deduplication by a file groveler on a regular schedule. The background processing mode checks for files that are eligible for deduplication on a set schedule. Hot data (files that are being written to) will be passed over by deduplication until the file reaches a certain age. Files that meet the deduplication criteria are referred to as "in-policy" files. A setting determines how old a file should be before they become eligible for deduplication. The setting has a default and is also configurable by the user. Particular file types and/or locations can be excluded from deduplication.

Deduplication is transparent so that applications and end users do not know that the data has been transformed on disk. When a user requests a file, it is transparently served up, returning all data to its correct location in the file.

Deduplication segments files into variable-sizes (32-128 kilobyte chunks). The chunking module splits a file into a sequence of chunks in a content dependent manner. The chunks have an average size of 64 KB and they are compressed and placed into a chunk store located in a hidden folder at the root of the volume called the System Volume Information, or "SVI folder". The normal file is replaced by a small reparse point and/or sparse data point, which have a pointer to a map of all the data streams and chunks required to "rehydrate" the file and serve it up when it is requested. As used herein, rehydrate will be used to indicate the process of reconstructing the original file format. Thus, a rehydrated deduplicated file is a deduplicated file that has been rehydrated to its original format.

In FIG. 1, the deduplication process is illustrated by deduplication engine 132. After the deduplication engine is finished processing a file, the file structure is changed, as discussed above. Thus, the structure of file 1 is modified and illustrated as 134 and the structure of file 2 is modified and illustrated as 136. File 1 and file 2 retain their metadata (illustrated by 114 and 116, respectively) and have links to the appropriate data chunks as illustrated by sparse point 138 and reparse point 140 for file 1 and sparse point 142 and reparse point 144 for file 2.

As illustrated in FIG. 1, the data chunks are stored in chunk store 146. As discussed above, these can be stored in a compressed format. Also as discussed above, the chunk store is stored in a hidden folder on the volume, the SVI folder.

Figure 2:
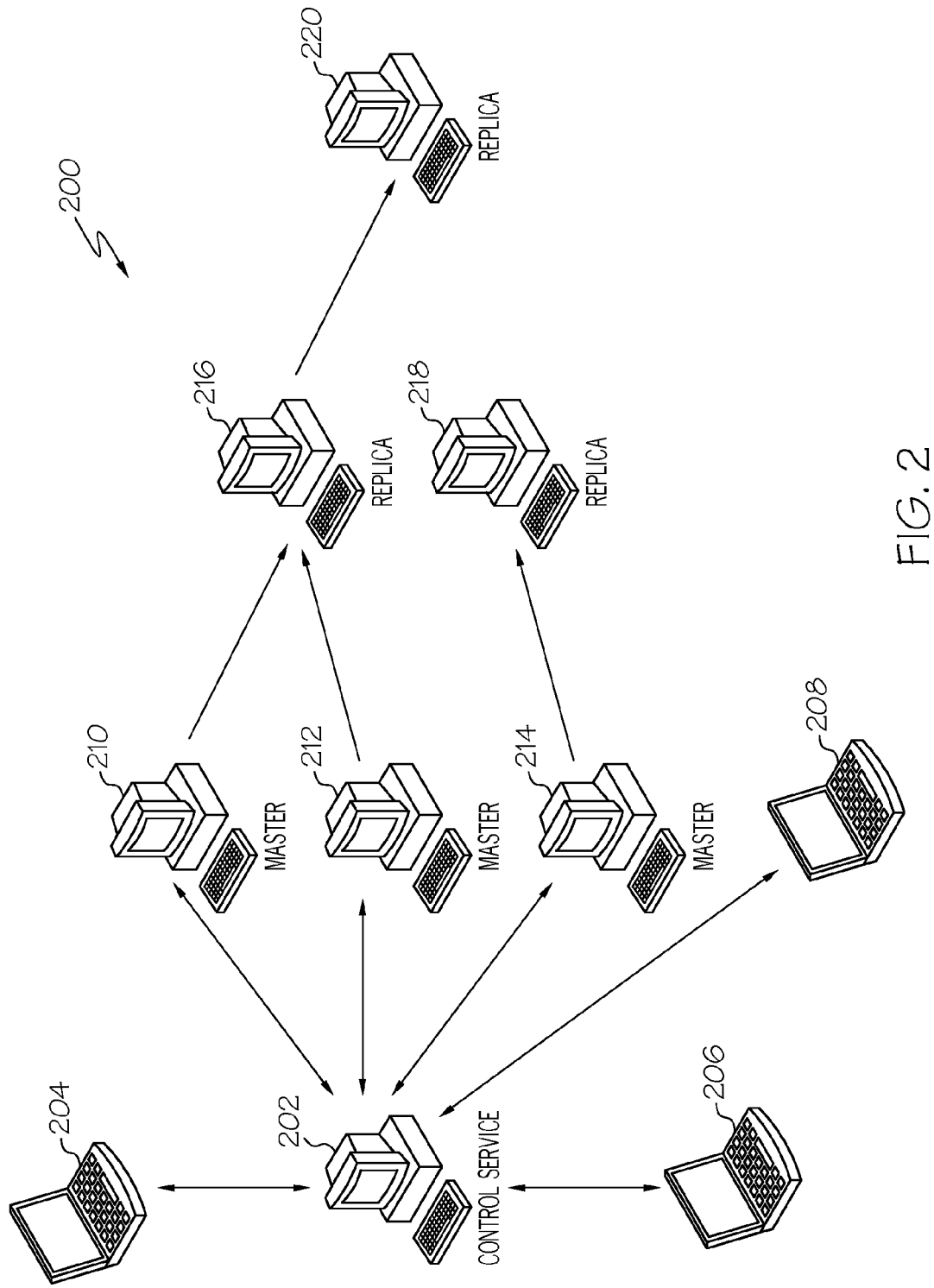
FIG. 2 illustrates an example deployment of master and replica systems.

FIG. 2 illustrates an example deployment of master and replica systems. Such a deployment illustrates various deployment options where data on the master systems is protected by copying it onto the replica systems. The deployment in FIG. 2 is illustrated generally as 200. The deployment may include a control service 202 executing on a device as depicted. Control service 202 allows administration and management of the deployment and the various entities and services within the deployment.

Control service 202 is generally accessible directly on its device, or remotely accessible through various devices and systems as illustrated by devices 204, 206, and 208. In some embodiments, access may be through a shell or other such automation. In a deployment utilizing the Windows Operating System, for example, where control service 202 is executing on a system running the Windows Operating System, control service 202 may be accessed and administered through PowerShell, which is task automation framework, consisting of a command-line shell and associated scripting language built on top of Microsoft's .NET Framework. In other embodiments, email may be used to access and interact with control service 202. In still other embodiments, devices 204, 206 and 208 may use other means to remotely access and administer control service 202.

Deployment 200 includes systems where some form of data protection is desired. These are illustrated in FIG. 2 as master systems 210, 212, 214. Locations where data to be protected is copied is referred to as a replica. FIG. 2 illustrates replicas 216, 218 and 220. These master systems and replicas can be actual computer systems or devices or virtual machines or a combination of both.

The goal of data protection will be to preclude loss of the data residing on storage devices of a master system and, in some instances, allowing automatic failover to a replica system if something should happen to the master system. In this disclosure, such protection will be afforded by either synchronization or replication of data from a master system (or replica) to a replica.

Synchronization refers to the periodic copying or "snapshot" of the storage devices of the master system (or replica) to a replica. Such synchronization typically occurs on a designated schedule. Synchronization can occur at the volume level or at the file level. For volume level synchronization, typically all data on a volume is copied to the replica. However, in many instances, certain data resides on a volume that would not be beneficial to copy or that should be skipped in a particular deployment. In these instances, such data can be skipped and not synchronized to the replica. Examples of situations where this will occur are discussed below.

In addition to volume level synchronization, file level synchronization can occur. In this instance, files are copied from a volume to a replica. Again, some files can be skipped as determined by a configuration or because it would not be profitable to copy such files to the replica. Examples are discussed below.

Finally, data on a master can be protected by replication. In this situation, an initial copy of a volume is typically made on the replica. Then as changes are made to the volume, the changes are copied and sent to the replica where they are applied. In this way, a real time, or near real time, protection system can be established.

As illustrated in FIG. 2, multiple master systems can be copied to a single replica system. This is illustrated where master systems 210 and 212 are copied to replica 216. Similarly a replica can be protected by copying data from the replica to another replica as illustrated by replica 216 being protected by replica 220.

Figure 3:
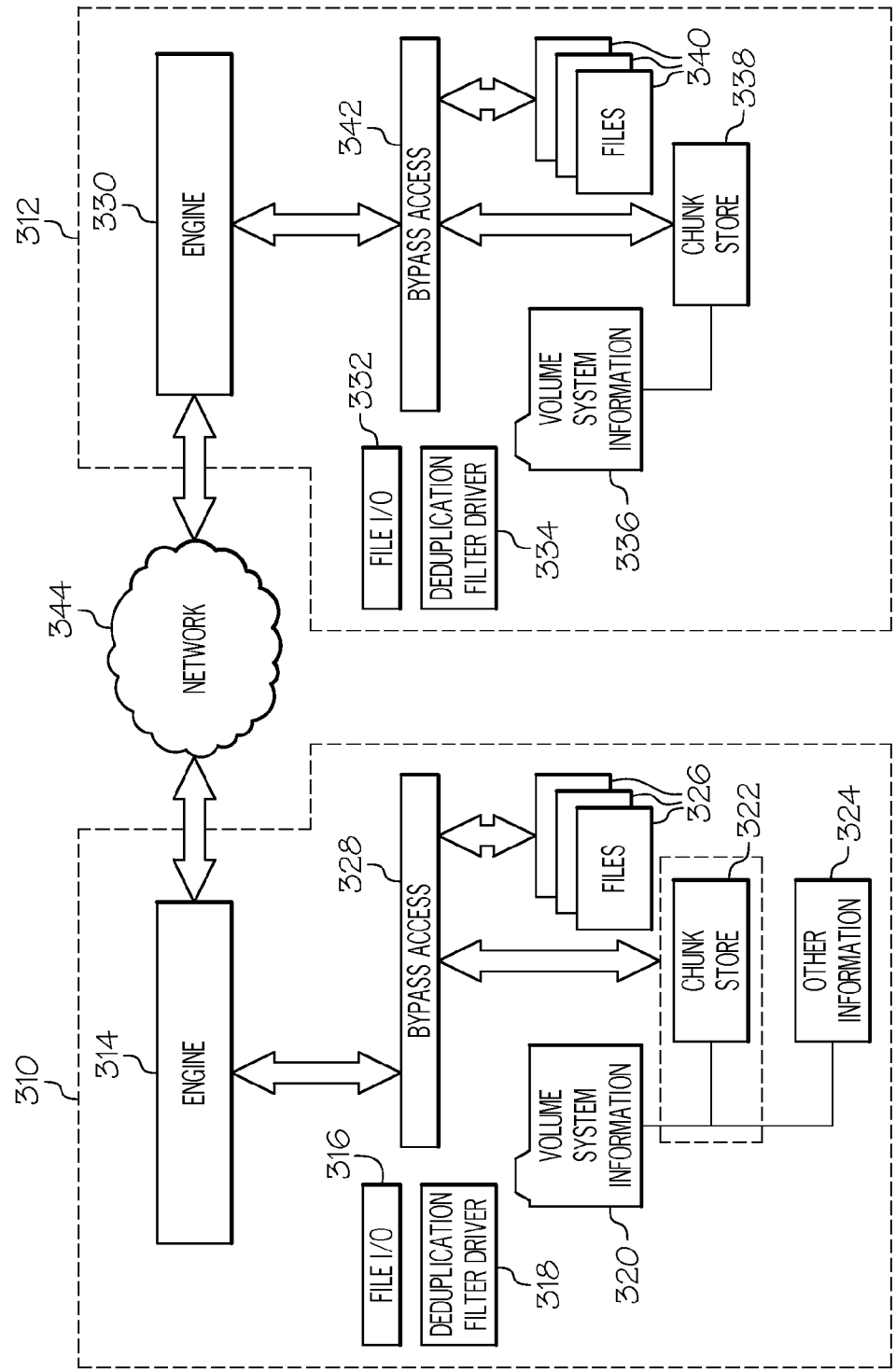
FIG. 3 illustrates an example embodiment of volume level synchronization.

FIG. 3 illustrates an example embodiment of volume level synchronization. Volume level synchronization sends all (or nearly all) data of a volume to the replica. However, useless data should not be sent in order to minimize bandwidth utilized for transferring data and to minimize replica storage requirements. In this context useless data may comprise data that is not needed for normal functioning of the replica (e.g., would not be "missed" if the data from the replica needs to be used to recreate the master) and/or data that has been excluded from protection for one reason or another. Sometimes useless data comprises data that a system would normally recreate when the data from a replica is used to recreate the master.

In FIG. 3, master 310 includes files 326. Files 326 may include files that have been deduplicated as described in conjunction with FIG. 1. In this situation, the chunk store 322 will contain information as illustrated in conjunction with FIG. 1 (e.g., data blocks referenced by the deduplicated files). Therefore, chunk store 322 contains information that should be transferred to the replica.

As illustrated in FIG. 3, chunk store 322 is contained in volume system information folder 320. Volume system information folder 320 may also include other information 324. When performing volume level synchronization, other information 324 need not be transferred to the replica.

Also illustrated in FIG. 3 is file I/O 316 and deduplication filter driver 318. These blocks represent a mechanism to retrieve deduplicated files from the system. However, files retrieved in this manner will be rehydrated. In order to minimize the bandwidth used to transfer information from master 310 to replica 312, deduplicated files 326 and chunk store 322 should be accessed in a manner that retrieves deduplicated files 326 and chunk sore 322 intact (e.g. without rehydrating the deduplicated files). This is illustrated in FIG. 3 by bypass access 328.

Although bypass access 328 is illustrated as separate from file I/O 316 and deduplication filter driver 318, it may also be part of file I/O 316 and/or deduplication filter driver 318. In such an embodiment, file I/O 316 and/or deduplication filter driver 318 need only provide a mechanism for retrieving deduplicated files 326 and chunk store 322 intact (e.g. without rehydrating the deduplicated files).

In FIG. 3, the information to be protected may also include files that have not been deduplicated. Although these are not specifically illustrated in FIG. 3, in many instances volumes to be protected will contain at least some files that have not been deduplicated. Some of these files are not deduplicated because they are either excluded from deduplication for one reason or another or are not suitable for deduplication. Others of these files may not be deduplicated because deduplication has not yet been performed on them. As previously discussed, depending on the deduplication settings, only files of a certain "age" are considered for deduplication in some embodiments.

In situations where master 310 has a mixture of deduplicated and non-deduplicated files, the non-deduplicated files may be retrieved in the "normal" way (e.g., without worrying about preserving the deduplicated structure intact). Of course, if the non-deduplicated files are compressed in other ways or have other unique attributes or features, care can also be taken to preserve the original file structure during retrieval.

As indicated in FIG. 3, data retrieved by engine 314 (e.g., data to be protected and sent to replica 312) is sent to replica 312. Typically this data is sent via a network, such as network 344. Network 344 may be of any type, such as a Local Area Network (LAN) or a Wide Area Network (WAN).

Replica 312 receives the data as indicated by engine 330. Replica 312 then stores the received information. Replica 312 is illustrated as comprising virtually the same type of components as master 310 including file I/O 332, deduplication filter driver 334 and bypass access 342. Again, bypass access 342 represents a mechanism to store deduplicated files, such as files 340, and chunk store, such as chunk store 338, without the need to rehydrate them (and perhaps deduplicate them once stored). In some embodiments, such bypass access may be separate from the usual way of storing files and other information. In other embodiments, such bypass access may be provided by file I/O 332 and/or deduplication filter driver 334.

As indicated in FIG. 3, received deduplicated files 340 may be stored along with received chunk store 338. Chunk store 338 may be stored in volume system information folder 336. Preserving this relationship allows normal operation of the deduplication system of the windows operating system.

Although these are not specifically illustrated in FIG. 3, some of the data received by engine 330 may contain at least some files that have not been deduplicated. Some of these files are not deduplicated because they are either excluded from deduplication for one reason or another or are not suitable for deduplication. Others of these files may not be deduplicated because deduplication has not yet been performed on them. As previously discussed, depending on the deduplication settings, only files of a certain "age" are considered for deduplication in some embodiments.

In situations where replica 312 receives a mixture of deduplicated and non-deduplicated files, the non-deduplicated files may be stored in the "normal" way (e.g., without worrying about preserving the deduplicated structure intact). Of course, if the non-deduplicated files are compressed in other ways or have other unique attributes or features, care can also be taken to preserve the original file structure during storage.

If master 310 has deduplication enabled using particular settings, these settings can be retrieved and sent to replica 312. Replica 312 may then enable deduplication using the same settings as master 310. If this is done, non-deduplicated data retrieved by engine 314 and sent to replica 312 will be treated the same on replica 312 as it is on master 310. This will keep the data of replica 312 consistent with master 310.

As an example, consider a system with deduplication enabled such that only files older than 1 week are considered for deduplication. If a file is copied from master 310 to replica 312 in its non-deduplicated state, and later deduplicated on master 310, then if deduplication is enabled on replica 312 using the same settings (including the same schedule and settings that determine which files are considered for deduplication), then the file will be deduplicated on replica 312 as well.

Alternatively, or additionally, as the deduplication schedule will be applied to replica 312 from master 310 the schedule may be translated to the replica time zone. When the schedule is translated to the replica time zone, as long as the files on master 310 are deduplicated, the files on replica 312 will also be deduplicated, since master and replica has same deduplication schedulers for the protected volumes.

Figure 4:
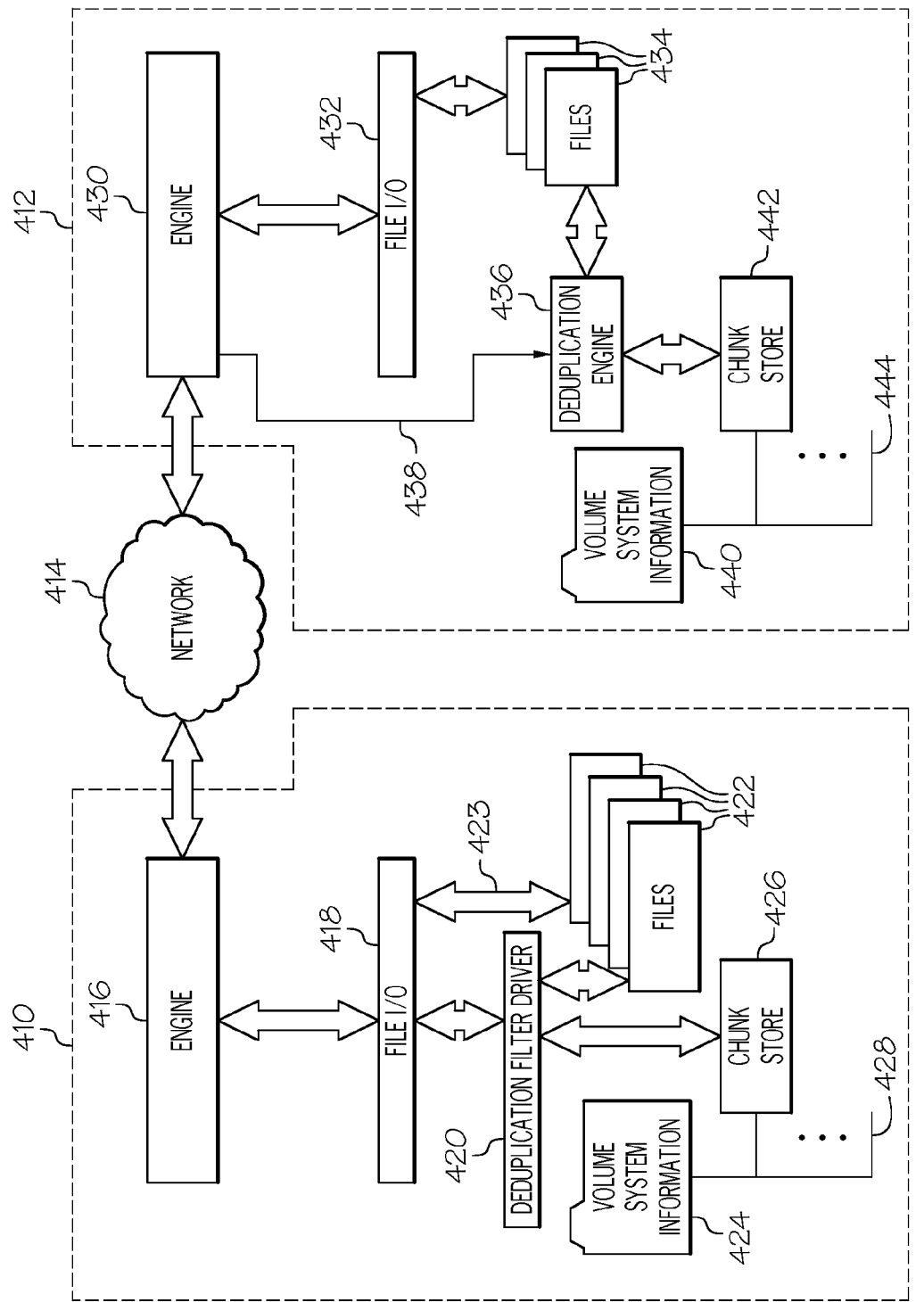
FIG. 4 illustrates an example embodiment of file level synchronization.

FIG. 4 illustrates an example embodiment of file level synchronization. File level synchronization reads data at a file level and synchronizes it from a master to a replica. It differs from volume level synchronization primarily in how the data is accessed on the master. Like volume level synchronization, the goal is to protect the desired information on the master by copying it to the replica.

FIG. 4 illustrates master 410 including an engine 416. Engine 416 accesses the data on master 410 to be protected and sends the data to replica 412 (using an appropriate network interface and network stack), usually over a network, such as network 414.

Master 410 includes mechanisms to access deduplicated files as well as non-deduplicated files, assuming both deduplicated files and non-deduplicated files exist on master 410. Of course, some embodiments may only contain deduplicated files or non-deduplicated files. In FIG. 4, files 422 represent both deduplicated files and non-deduplicated files. In FIG. 4, file I/O 418 represents the mechanism used by engine 416 to access files 422. In some embodiments access to both deduplicated files and non-deduplicated files may be accomplished by the same mechanism (such as that illustrated by file I/O 418). In other embodiments, different mechanisms may provide access to deduplicated files and non-deduplicated files. FIG. 4 shows engine 416 accessing non-deduplicated files 422 through file I/O 418 as shown by arrow 423. FIG. 4 also shows engine 416 accessing deduplicated files 422 via file I/O 418 and deduplication filter driver 420.

In FIG. 4, deduplication filter driver 420 represents a mechanism provided by the system to access deduplicated files 422 in a manner that rehydrates the files. Deduplication filter driver 420 access deduplicated files 422 and chunk store 426 and uses the information stored therein to rehydrate the file and return it to engine 416 via file I/O 418. The result is the file as if it had not been deduplicated.

Chunk store 426 is stored within system volume information folder 424. System volume information folder 424 may also include additional information as indicated by line 428.

Master 410 of FIG. 4 may also include a deduplication engine (not shown) along with its settings. The deduplication settings are transferred from master 410 to replica 412 so files can be deduplicated on the replica as discussed below.

As previously discussed, replica 412 receives files sent from master 410 and stores them on an appropriate volume, using engine 430 as illustrated in FIG. 4. Although not specifically illustrated in FIG. 4, engine 430 typically receives the files using an appropriate network interface and network stack.

Engine 430 stores the received files on an appropriate volume. FIG. 4 illustrates the mechanism to accomplish this as file I/O 432. File I/O 430 represents a mechanism provided by the operating system, or virtual machine environment if engine 430 is executing within a virtual machine. Files 434 represent the files as stored on the volume.

Replica 412 includes deduplication engine 436 and chunk store 442. Chuck store 442 is located within volume system information folder 440. Volume system information folder can contain other information as indicated by 444.

As previously mentioned, replica 412 receives deduplication settings from master 410. These deduplication settings can contain any information used by master 410 for deduplication, such as a deduplication schedule, files that should be included or excluded from deduplication, the age that files should be considered for deduplication, etc.

Using the received deduplication settings, engine 430 may set up deduplication engine 436 to mirror what happens on master 410. Thus, files 434 will be treated the same on replica 412 as files 422 are on master 410. In this way, files that are deduplicated on master 410 will be deduplicated on replica 412.

Figure 5:
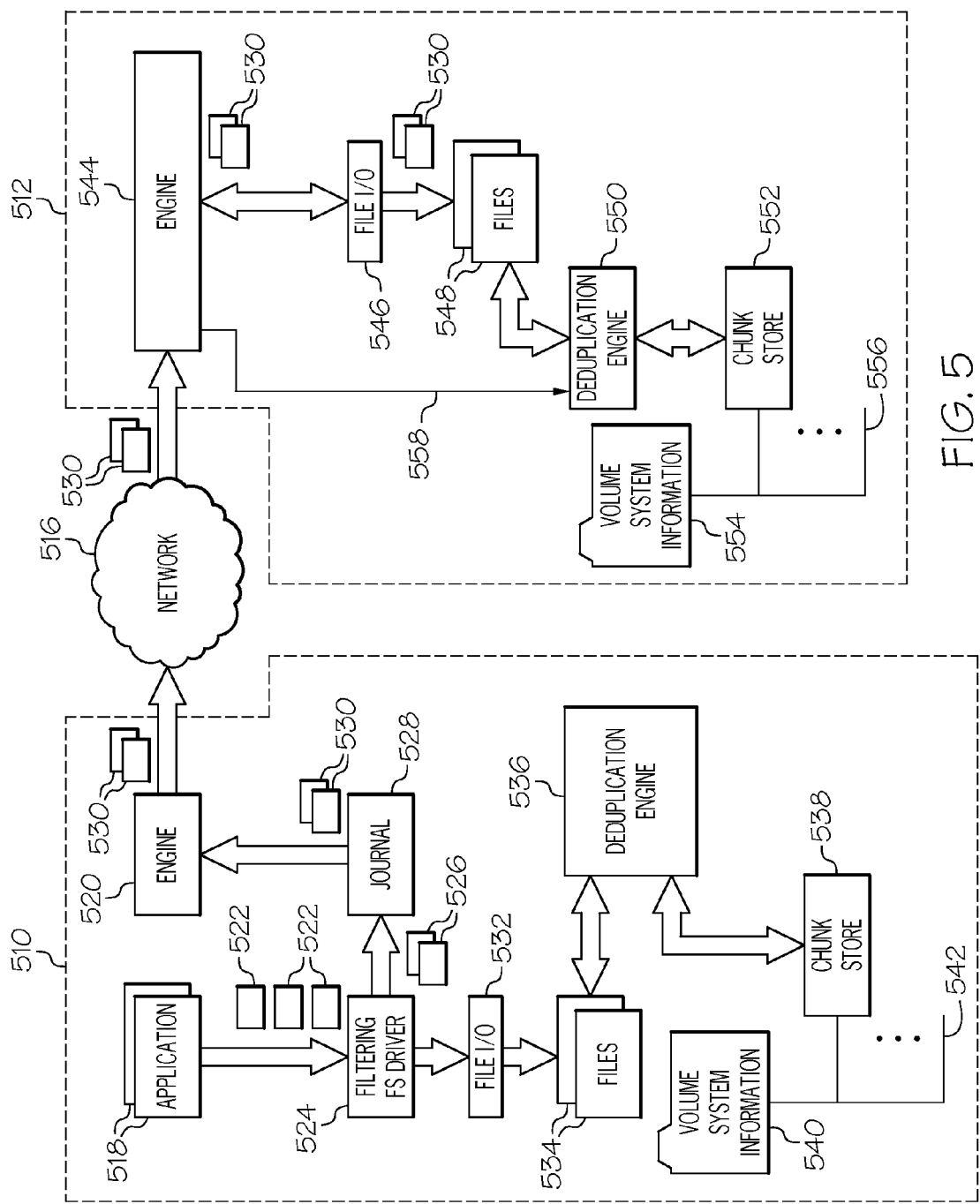
FIG. 5 illustrates an example embodiment of replication.

FIG. 5 illustrates an example embodiment of replication. Replication tends to differ from either volume level synchronization (FIG. 3) or file level synchronization (FIG. 4) since it tends to capture and replicate data as it is written to the volume (e.g., capture changes as they happen) rather than synchronize either the volume or files on a periodic schedule. Of course, capturing incremental snapshots on a short schedule (e.g., snapshots taken close together) can approximate continuous capture.

In FIG. 5, master 510 captures data as it is written to the file system and sends the data to replica 512, typically over a network such as network 516. The data capture on master 510 captures changes as they occur to the master and replicate the changes to the replica in order to keep master 510 and replica 512 in sync. Such changes can occur, for example, when files are created, modified or removed. Captured changes may be an entire volume (or volumes) or may be limited, for example, to only portions of a volume and/or specific files and/or files and/or volumes that meet specific criteria. Settings can also be captured and replicated, as for example when deduplication settings are captured and replicated.

However, useless data should not be captured in order to minimize bandwidth utilized for transferring data and to minimize replica storage requirements. In this context useless data may comprise data that is not needed for normal functioning of the replica (e.g., would not be "missed" if the data from the replica was used to either recreate the master or if the master failed and the replica took over as a master) and/or data that has been excluded from protection for one reason or another. Sometimes useless data comprises data that a system would normally recreate during these scenarios.

FIG. 5 illustrates applications 518 as making changes, illustrated by blocks 522. Blocks 522 are examined by filtering file service driver 524 to see what blocks are "bound" to the replication scenario. In other words, filtering file service driver 524 identifies those blocks that should be captured to meet the settings of the replication as described above. The identified blocks 526 may be preserved in a journal 528 (or used to create a journal depending on implementation). Journal 528 stores those changes that should be replicated to replica 512. Engine 520 retrieves the journaled changes 530 and sends them to replica 512. Engine can, of course, use appropriate network interfaces and network stacks to send journaled changes 530.

Filtering driver 524 may then use the typical provided mechanisms for sending the changes to the files as expected by applications 518. FIG. 5 illustrates this mechanism as file I/O 532. File I/O 532 stores changes in the volume either directly or through other layers. The changes may include, for example, creating, modifying, and/or deleting files. FIG. 5 illustrates this by files 534.

Master 510 may also contain deduplication engine 536 to deduplicate files as previously discussed. Deduplication engine 536 deduplicates files 534 according to its designated settings, storing data blocks in chunk store 538 as previously described. Chunk store 538 may be located in volume system information folder 540 along with additional information, as illustrated by 542.

Replica 512 receives journaled changes 530, typically via an appropriate network interface and network stack (not shown). Engine 544 takes changes 530 and writes them to the replica volume via normal operating system mechanisms, such as that illustrated by file I/O 546. File I/O 546 then writes the changes to the replica volume to keep the replica volume in sync with the master volume. Through this mechanism, information on the replica volume, such as files 548, are synchronized with the master volume. As previously discussed, there is no need to replicate useless information to the replica volume.

Deduplication settings may also be replicated from master 510 to replica 512. These deduplication setting can comprise any information needed to set up deduplication on the replica in the same way that it is set up on the master. The settings can include, for example, a deduplication schedule, criteria regarding what files should be considered for deduplication, etc. The deduplication schedule can be translated to the time zone of the replica in order to keep the same schedule on the replica as it is on the master. Engine 544 can use the replicated deduplication settings to configure deduplication engine 550 in the same manner as deduplication engine 536 is configured on the master. This is illustrated by arrow 558. The process consists of standard calls to the operating system (or virtual machine as appropriate) APIs to configure the deduplication engine appropriately. Such configuration needs no further explanation, as one of ordinary skill in the art would readily know how to match configurations through appropriate system calls.

As configured, deduplication engine 550 will deduplicate files 548, storing appropriate information in chunk store 552, as previously described. Chunk store 552 is stored in volume system information folder 554, possibly along with other information as indicated by 556.

Figure 6:
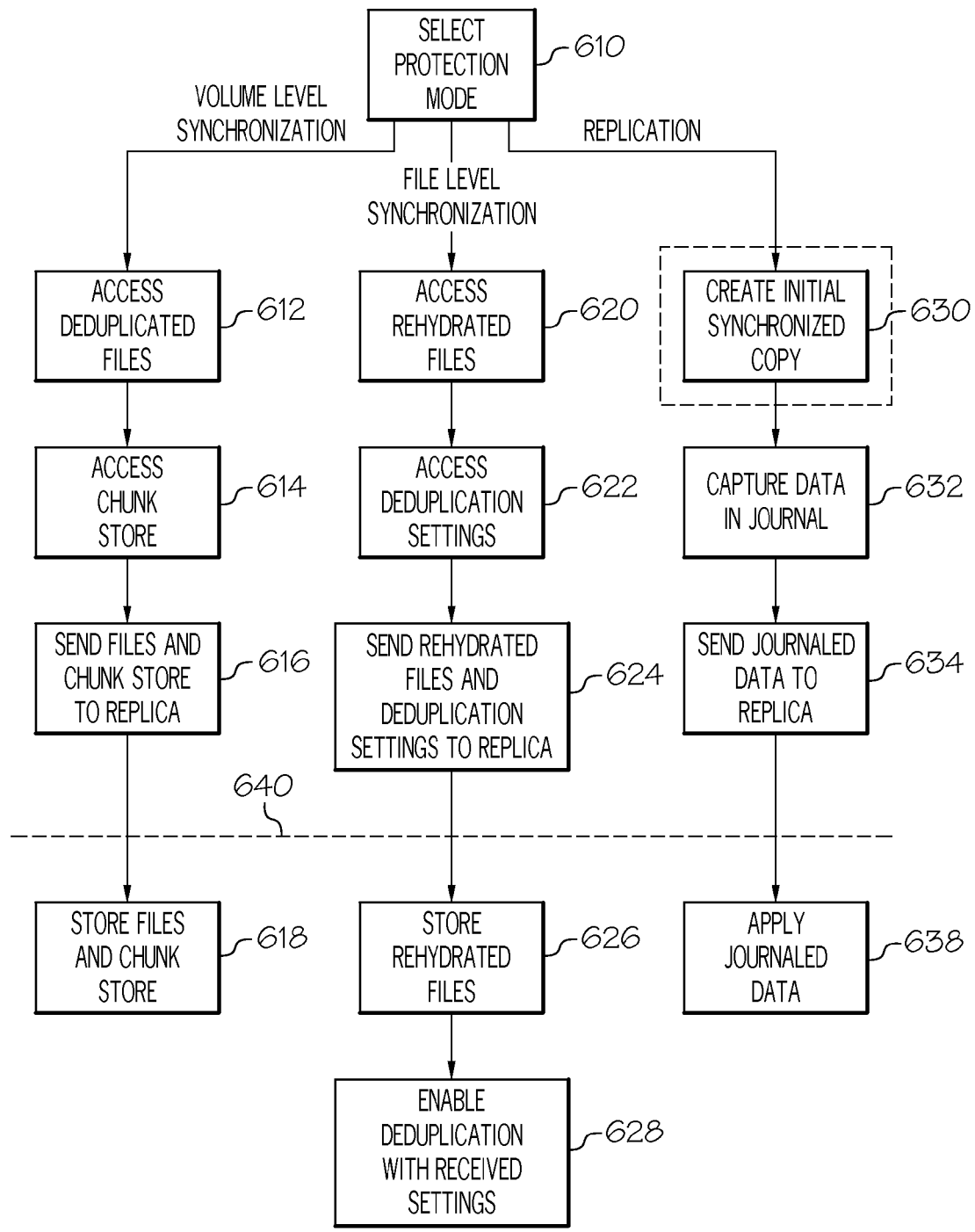
FIG. 6 illustrates an example flowchart for volume level synchronization, file level synchronization, and replication

FIG. 6 illustrates an example flowchart for volume level synchronization, file level synchronization, and replication. Block 610 represents a determination or selection of which protection mode will be used. The various protection modes have been previously described in conjunction with FIG. 3, FIG. 4, and FIG. 5. The determination (or selection) may be accomplished through presenting a user with choices via a user interface during configuration of the system. This may be accomplished, for example, via control service 202 of FIG. 2. Block 610 may also represent a determination by the system based on prior configuration information that a particular protection mode should be used. This determination may be made at various levels at various times. For example, control service 202 of FIG. 2 may make the determination and configure a master and/or replica appropriately. A master and/or replica may also make the determination upon execution.

When volume level synchronization is used as the protection mode, the branch starting with block 612 is used. Note that the branch is illustrated as a single linear path of execution, however execution of the branch may occur on a particular schedule, so that it is repeated on a periodic basis. In this repetition, block 610 may not need to be revisited.

In block 612 the deduplicated files are accessed (such as by engine 314 of FIG. 3). This access occurs without rehydrating the files. This is may be accomplished using a mechanism provided by the host operating system (e.g., Windows) and/or, perhaps, a virtual machine. If the host does not provide appropriate access, then a special driver may be provided to gain appropriate access.

In block 614, the system retrieves the chunk store, such as chunk store 322 of FIG. 3. The chunk store is again retrieved intact, so that the links between the deduplicated files and the chunk store are preserved. Note that this may not mean that the links between the files and chunk store do not change, it simply means that after retrieval (and transfer to the replica) the links between the files and chunk store are not broken (see, for example, the links in FIG. 1).

As previously discussed, the chunk store is stored in the system volume information folder, along with possibly other information. From a data protection standpoint, the other information in the system volume information folder is useless in most, if not all, situations and may generally be skipped during volume synchronization.

In block 616 the files and chunk store are sent from the master to the replica for storage. This is typically accomplished over an appropriate network as previously described in conjunction with FIG. 3.

Although blocks 612, 614 and 616 illustrate accessing and transferring both files and chunk store, it may also be possible to only access and transfer those aspects that have changed since the files and chunk store were last accessed and transferred to the replica. Such in incremental approach may be applied to any of the protection modes outlined in this disclosure. Alternatively, or additionally, full access and transfer may occur. In still other embodiments, a combination may be used with a full access and transfer being performed sometimes and an incremental access and transfer being performed between full access and transfer.

In FIG. 6, blocks below dashed line 640 represent actions taken by the replica. After the files and chunk store are sent from the master, the replica receives them and in block 618 stores them on an appropriate replica volume. When dealing with deduplicated files, since the files are already in deduplicated format, no deduplication need be performed. However, if needed, the integrity of the links can be ensured. This may take the form, for example, of checking the links in the files and ensuring they are updated (if necessary) to point to the correct location in the chunk store.

When the selected mode is file level synchronization, the master accesses files through a mechanism that rehydrates the files as they are retrieved. This is illustrated by block 620. The files to be protected may be identified in a variety of ways, including protecting all files on the volume, excluding or including files meeting a certain criteria, or any other selection criteria.

In addition to information that should be protected (such as the accessed files), the system also access deduplication settings as illustrated by block 622. This may include, for example, a deduplication schedule, settings that identify which files should be considered or excluded from consideration for deduplication, the age at which files should be considered for deduplication, or any other deduplication settings.

As files and the deduplication settings are retrieved, the master sends them to the replica as illustrated in block 624, typically over an appropriate network using an appropriate network interface and network stack (see the discussion of FIG. 4).

As previously discussed, the blocks of 620, 622, and 624 may be used to synchronize the entire volume, or may capture incremental volume changes, or a combination of both (e.g., an entire volume synchronization followed by one or more incremental synchronizations). Also as previously discussed, although the execution path is represented by a linear sequence, the sequence may be periodically repeated according to a schedule.

The replica receives the rehydrated files and stores them on an appropriate volume of the replica as indicated by block 626. Files are stored using the usual operating system functionality. In block 628 the replica enables deduplication (assuming it isn't already enabled) using the received deduplication settings. The settings can include, for example, a deduplication schedule, criteria regarding what files should be considered for deduplication, etc. The deduplication schedule can be translated to the time zone of the replica in order to keep the same schedule on the replica as it is on the master. In this manner, the deduplication engine on the replica will function like the deduplication engine on the master and both the master volume and replica volume will come to mirror each other.

Since deduplication uses the age of files when considering which files to deduplicate (see discussion of FIG. 1), the age of the files on the replica may be set to the age of the files on the master. In this way files on the replica will be deduplicated at the same time as the same file on the master.

When the selected protection mode is replication, the branch starting with block 630 is utilized. Typically when replication is used to protect a volume, the master captures and replicates data as it is written to the volume (e.g., capture changes as they happen) rather than synchronize either the volume or files on a periodic schedule. Of course, capturing incremental snapshots on a short schedule (e.g., snapshots taken close together) can approximate continuous capture. Thus this branch may be continuously executing in some embodiments.

Replication typically begins with full volume synchronization, although that is not always necessary. This optional step is illustrated in block 630. Obviously, if replication were continuously executing, block 630 would not be continuously executed. Rather, block 630 represents an initial (or, perhaps, occasional) synchronization to start the replication process. Any synchronization process that provides an initial state where both the master and replica are in sync can be used. Examples include volume level synchronization and/or file level synchronization. Furthermore, only those portions of the master volume that are to be protected by replication need be in sync at this point.

In replication, changes made to a volume are captured so they can be transferred to the replica. Block 632 illustrates the capture process. The process may be accomplished, for example, using the filtering driver 524 described in conjunction with FIG. 5. The process should capture the changes that are "bound" to (e.g., important to) the replication scenario. These can be captured in a journal or other log as appropriate until they can be transferred to the replica. Captured changes are sent to the replica as illustrated by block 634.

As the replica receives changes, they are applied to the replica volume to keep the replica in sync with the master. Block 638 illustrates this process. Although not specifically illustrated in FIG. 6, deduplication settings may also be captured (or retrieved) and sent to the replica. As the deduplication settings are received, the deduplication engine on the replica can be enabled using the received settings, to keep files on the replica deduplicated in the same manner as they are on the master.

Embodiments described herein may be implemented in a variety of hardware and/or software configurations. An example embodiment extends to a machine in the example form of a computing device, such as that of FIG. 7, within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In one embodiment, multiple such machines are utilized in a distributed network to implement multiple components in a transaction based environment. An object-oriented, service-oriented, or other architecture may be used to implement such functions and communicate between the multiple systems and components.

The machine may be a personal computer (PC), a tablet device, a Personal Digital Assistant (PDA), a cellular telephone or smartphone, a web appliance, etc. Further, while only a single machine is illustrated, the term "machine" shall also be taken to include any collection of machines that individually or jointly execute a set (or multiple sets) of instructions to perform any one or more of the methodologies discussed herein.

Figure 7:
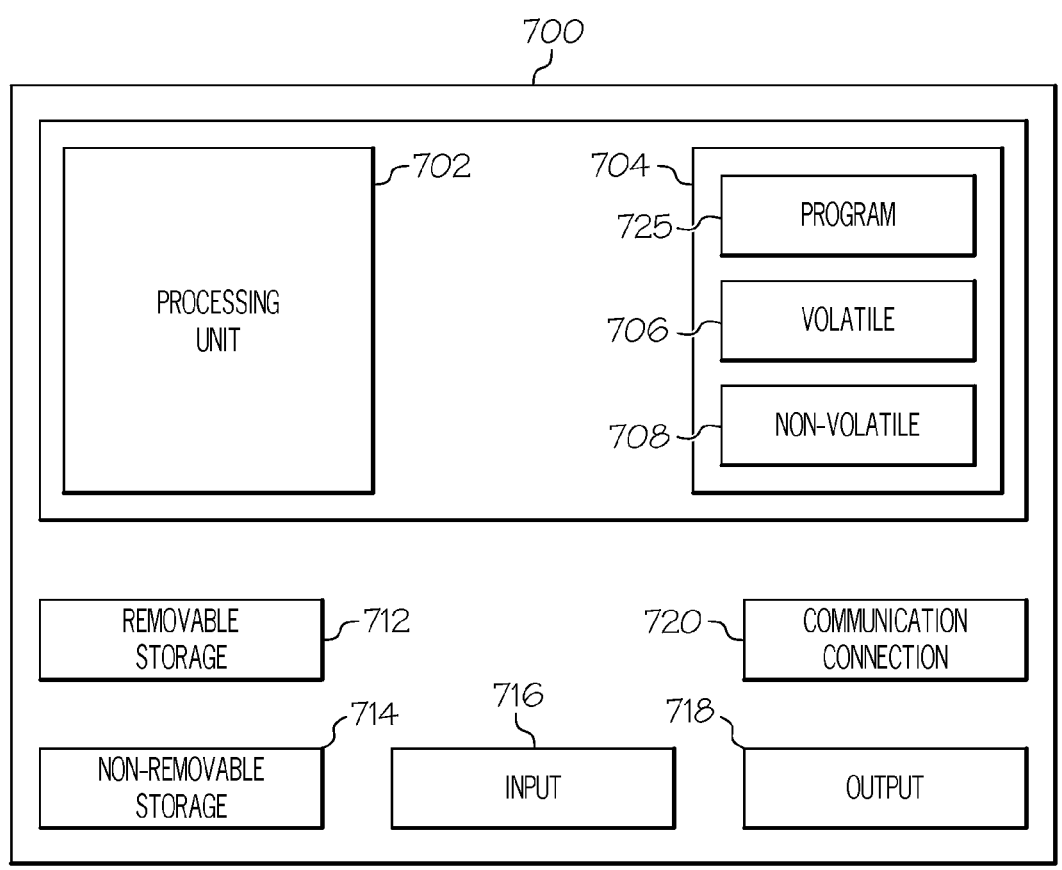
FIG. 7 illustrates an example embodiment of a device suitable for use herein.

An example machine 700 is illustrated in FIG. 7 and may include a processor 702 (e.g., a central processing unit (CPU), a graphics processing unit (GPU), advanced processing unit (APU) or any of the above in any combination), and memory of various forms. The machine may further include a display or other output 718 and an input device 716 such as keyboard, touch screen, various user interfaces such as on screen keyboards, gesture input, voice input, etc.

Machine-Readable Medium

Embodiments also may include machine-readable storage medium on which is stored one or more sets of instructions and data structures (e.g., collectively instructions 725) embodying or used by any one or more of the methodologies or functions described herein. The instructions may also reside, completely or at least partially, within the memory or within the processor during execution thereof by the computer system, with the memory and the processor also constituting machine-readable media.

While the machine-readable storage medium may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present application, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory 708, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. Any of which can be either removable storage 712 or non-removable storage 714, although some are typically found as one or the other (e.g. removable or non-removable). Machine-readable storage media may also include volatile memory 708.

Transmission Medium

The instructions may further be transmitted or received over a communications network using a transmission medium via a network interface device (using, for example communication connection 720) and utilizing any one of a number of well-known transfer protocols. Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
   determining, by a first device, that a storage volume should be synchronized or replicated to a replica storage volume, wherein the storage volume comprises volume data, data chunks, deduplicated files, and deduplication setting data, wherein each of the data chunks corresponds to a plurality of the deduplicated files;
   in response to determining that the storage volume should be synchronized or replicated to the replica storage volume, determining, by the first device, whether the storage volume is configured or volume level synchronization, file level synchronization, or replication;
   in response to determining that the storage volume is configured for volume level synchronization,
      identifying, by the first device, a first folder, wherein the first folder comprises the volume data and a second folder, wherein the second folder comprises the data chunks;
      reading, by the first device, the data chunks from the second folder;
      reading, by the first device, the deduplication settings;
      reading, by the first device, the deduplicated files without rehydrating the deduplicated files;
      determining, by the first device, that the volume data is excluded from synchronization;
      in response to determining that the volume data is excluded from synchronization, skipping, by the first device, the volume data; and
      sending, by the first device, the deduplicated files, the deduplication setting data, and the data chunks to a second device that comprises the replica storage volume.

2. The method of claim 1 further comprising:
   in response to determining that the storage volume is configured for file level synchronization,
      reading, by the first device, the deduplicated files in a manner to rehydrate the deduplicated files; and
      sending, by the first device, the rehydrated files to the replica.

3. The method of claim 1 wherein the deduplication setting data comprises a schedule for deduplication.

4. A method of claim 2, wherein determining that storage volume is configured for volume level synchronization comprises determining that an operating system of the first device and an operating system of the second device is Windows Server 2012, wherein determining that the storage volume is configured for file level synchronization comprises determining that the operating system of the first device is not Windows Server 2012.

5. The method of claim 1 further comprising:
receiving, by the second device, the deduplicated files, the deduplication setting data, and the data chunks;
writing, by the second device, the deduplicated files and the data chunks to the replica storage volume; and
configuring, by the second device, deduplication of the replica storage volume in accordance with the deduplication setting data.

6. The method of claim 1, wherein the deduplicated files comprise a sparse point and a reparse point, wherein the sparse point and the reparse point each comprise a reference to a data chunk of the data chunks, wherein reading the deduplicated files without rehydrating the deduplicated files comprises:
sending, to a bypass mechanism, a request to read the deduplicated files; and
reading, by the bypass mechanism, the deduplicated files without resolving the references that comprise the sparse point and the reparse point.

7. A system comprising a first device, wherein the first device comprises:
a first processor; and
a first computer readable storage medium comprising instructions executable by the first processor to cause the first device to,
determine that a storage volume should be synchronized with a replica storage volume, wherein the storage volume comprises volume data, data chunks, deduplicated files, and deduplication setting data, wherein each of the data chunks corresponds to a plurality of the deduplicated files;
in response to a determination that the storage volume should be synchronized with the replica storage volume, determine that the storage volume is configured for volume level synchronization; and
in response to a determination that the storage volume is configured for volume level synchronization,
identify a first folder, wherein the first folder comprises the volume data and a second folder, wherein the second folder comprises the data chunks;
read the data chunks from the second folder;
read the deduplication setting data;
read the deduplicated files without rehydrating the deduplicated files;
determine that the volume data is excluded from synchronization;
in response to a determination that the volume data is excluded from synchronization, skip the volume data; and
send the deduplicated files, the deduplication setting data, and the data chunks to a second device that comprises the replica storage volume.

8. The system of claim 7 wherein the first computer readable storage medium further comprises instructions executable by the first processor to cause the first device to:
determine that the storage volume is configured for file level synchronization; and
in response to a determination that the storage volume is configured for file level synchronization,
read the deduplicated files in a manner to rehydrate the deduplicated files; and
send the rehydrated files to the replica.

9. The system of claim 7, wherein the first computer readable storage medium further comprises instructions executable by the first processor to cause the first device to:
determine that the storage volume is configured for replication; and,
in response to a determination that the storage volume is configured for replication,
identify first changes to the deduplicated files using a filtering file driver;
write the first changes to a journal file and the deduplicated files;
identify second changes to the volume data;
determine that the volume data is excluded from replication;
in response to a determination that the volume data is excluded from replication, write the second changes to the volume data without writing the second changes to the journal file; and
send the journal file to the second device.

10. The system of claim 7 further comprising the second device, wherein the second device comprises:
a second processor; and
a second computer readable storage medium comprising instructions executable by the processor to cause the second device to:
receive, from the first device, the deduplicated files, the deduplication setting data, and the data chunks;
write the deduplicated files and the data chunks to the replica storage volume; and
configure deduplication of the replica storage volume in accordance with the deduplication setting data.

11. The system of claim 7, wherein the deduplicated files comprise a sparse point and a reparse point, wherein the sparse point and the reparse point each comprise a reference to a data chunk of the data chunks, wherein the instructions executable by the processor to cause the first device to read the deduplicated files without rehydrating the deduplicated files comprise instructions executable by the processor to cause the first device to:
send, to a bypass access mechanism, a request to read the deduplicated files; and
read, by the bypass access mechanism, the duplicated files without resolving the references that comprise the sparse point and the reparse point.

12. The system of claim 7, wherein the instructions executable by the first processor to cause the first device to determine that the storage volume is configured for volume level synchronization comprises instructions executable by the first processor to cause the first device to determine that an operating system of the first device and an operating system of the second device is Windows Server 2012.

13. A computer product comprising a computer readable storage medium having program code embodied therewith, the program code to:
determine that the storage volume should be synchronized with a replica storage volume, wherein the storage volume comprises volume data, data chunks, deduplicated files, and deduplication setting data, wherein each of the data chunks corresponds to a plurality of the deduplicated files;
in response to a determination that the storage volume should be synchronized with the replica storage volume, determine that the storage volume is configured for volume level synchronization,
identify a first folder, wherein the first folder comprises the volume data and a second folder, wherein the second folder comprises the data chunks;

read the data chunks from the second folder;
read the deduplication setting data;
read the deduplicated files without rehydrating the deduplicated files;
determine that the volume data is excluded from synchronization;
in response to a determination that the volume data is excluded from synchronization, skip the volume; and
send the deduplicated files, the deduplication setting data, and the data chunks to a second device that comprises the replica storage volume.

14. The computer program product of claim 13, wherein the deduplicated files comprise a sparse point and a reparse point, wherein the sparse point and the reparse point each comprise a reference to a data chunk of the data chunks, wherein the program code further comprises program code to:
send, to a bypass access mechanism, a request to read the deduplicated files; and
read, by the bypass access mechanism, the deduplicated files without resolving the references that comprise the sparse point and reparse point.

15. The computer program product of claim 13, wherein the program code to determine that the storage volume is configured for volume level synchronization comprises program code to determine that an operating system of the first device and an operating system of the second device Windows Server 2012.

16. The computer program product of claim 13, wherein the program code further comprises program code to:
determine that the storage volume is configured for file level synchronization; and
in response to a determination that the storage volume is configured for file level synchronization,
read the deduplicated files in a manner to rehydrate the deduplicated files; and
send the rehydrated files to the replica.

17. The computer program product of claim 13, wherein the deduplication setting data comprises a schedule for deduplication.

18. The computer program product of claim 13, wherein the program code further comprises program code to:
determine that the storage volume is configured for replication; and
in response to a determination that the storage volume is configured for replication,
identify first changes to the deduplicated files using a filtering file driver;
write the first changes to a journal file and the deduplicated files;
identify second changes to the volume data;
determine that the volume data is excluded from replication;
in response to a determination that the volume data is excluded from replication, write the second changes to the volume data without writing the second changes to the journal file; and
send the journal file to the second device.

19. The computer program product of claim 13, wherein the program code further comprises program code to:
receive, from the first device, the deduplicated files, the deduplication setting data, and the data chunks;
write the deduplicated files and the data chunks to the replica storage volume; and
configure deduplication of the replica storage volume in accordance with the deduplication setting data.

20. The computer program product of claim 16, wherein the program code to determine that the storage volume is configured for file level synchronization comprises program code to determine that the operating system of the first device is not Windows Server 2012.

* * * * *